T861051

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 29, 1969

861 O.G. 1355

634,477

PROCESS FOR MULTICOLORED DYEING OF POLYCARBONAMIDE YARNS AND STAPLE

Gordon B. Robbins, Claymont, Del., assignor to E. I. du Pont de Nemours and Company, Wilmington, Del., a corporation of Delaware

Filed Apr. 28, 1967. Published Apr. 29, 1969
Int. Cl. D06p *3/84, 3/24*
U.S. Cl. 8—21
No Drawing. 18 Pages Specification

A blend of dissimilar nylon fibers in a carpet are dyed in an aqueous dyebath containing a mixture of acid and basic dyes and a sulfobetaine having the structure:

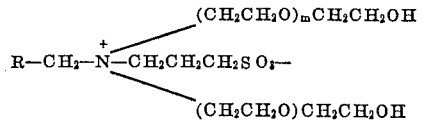

wherein R is an alkyl group of 7 to 17 carbons, *m* is from 0 to 3, *n* is from 0 to 3, and the sum of *m* and *n* is less than 4 to produce a multicolored carpet. The nylon fiber can have amino ends groups of (a) 55 to 85, (b) 25 to 55, (c) 5 to 25 or (d) 0 to 5 equivalents per $10^6$ grams and can be dyed with acid dyes such as C.I. Acid Yellow 14, C.I. Acid Blue 122, C.I. Disperse Blue 7 and C.I. Disperse Yellow 3 while the (d) group nylons can also be dyed by basic dyes such as C.I. Basic Blue 22, and C.I. Basic Blue 21. A mixture of the (a), (b) and (d) nylons are dyed first with the acid dyes and then with the basic dyes noted above. The sulfobetaine prevents the acid and basic dyes from precipitating together. The dyebaths contain, besides a sulfobetaine such as N-tallow- or N-coco-N,N-diethanol sulfobetaine, a small amount of silicone anti-foam agent, and sodium phosphate to adjust pH 7.0. The dyeing was done at 98° C.